No. 888,634. PATENTED MAY 26, 1908.
T. W. MORGAN.
DRIVING MECHANISM FOR CENTRIFUGAL CREAM SEPARATORS.
APPLICATION FILED MAY 11, 1907.
2 SHEETS—SHEET 1.
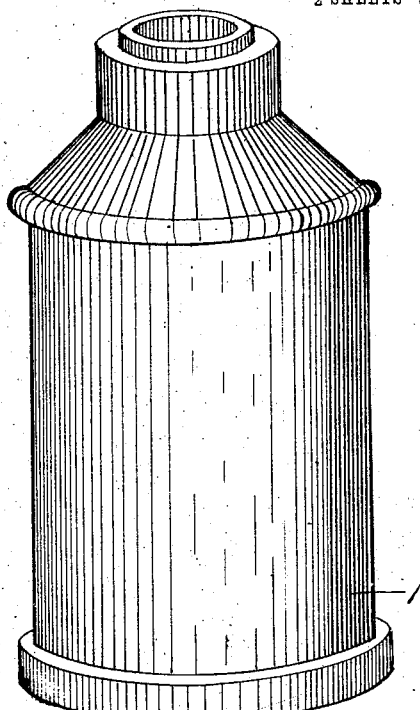
Fig. 1.
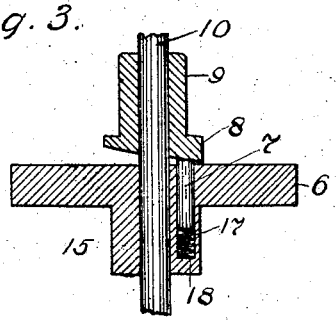
Fig. 3.
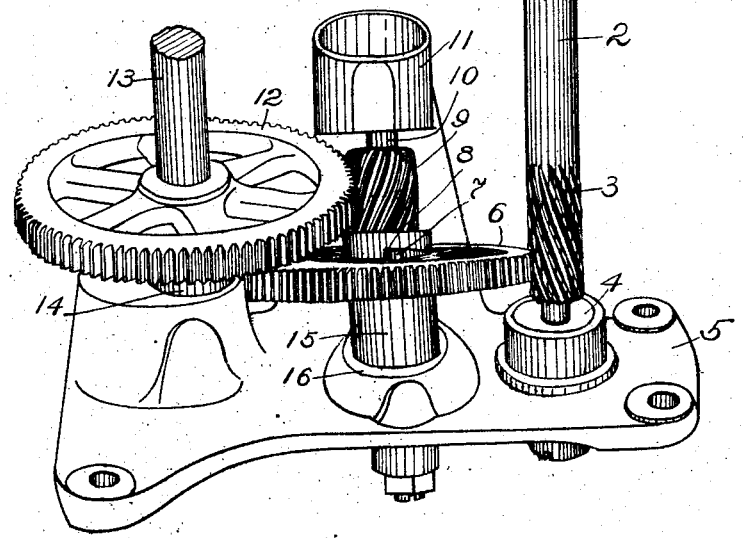
WITNESSES:
INVENTOR
Thomas W. Morgan,
BY
G. C. Kennedy
ATTORNEY No. 888,634. PATENTED MAY 26, 1908.
T. W. MORGAN.
DRIVING MECHANISM FOR CENTRIFUGAL CREAM SEPARATORS.
APPLICATION FILED MAY 11, 1907.
2 SHEETS—SHEET 2.
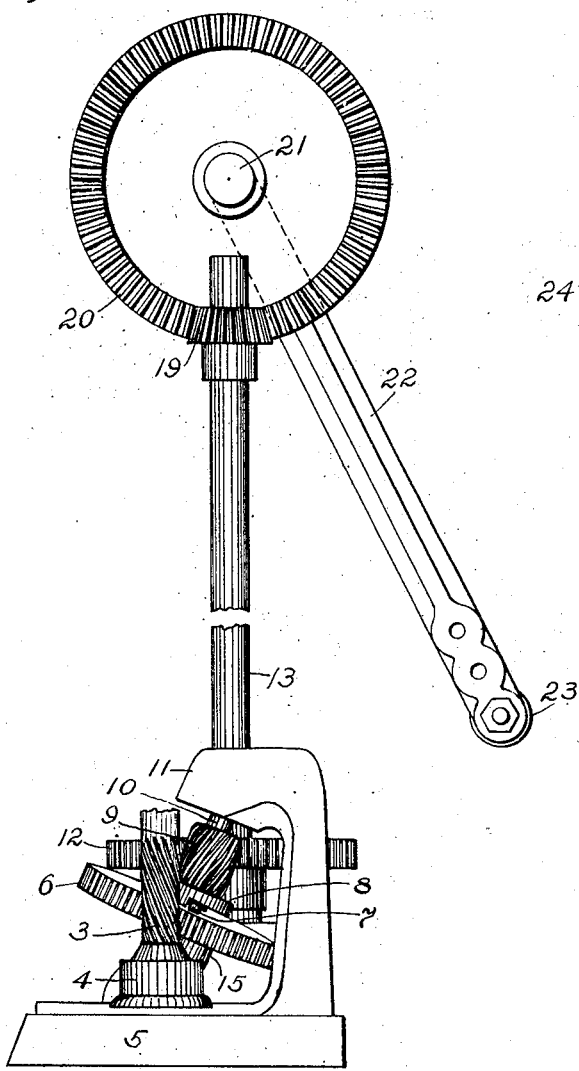
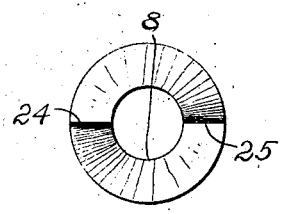
WITNESSES:
INVENTOR
Thomas W. Morgan,
BY
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

DRIVING MECHANISM FOR CENTRIFUGAL CREAM-SEPARATORS.

No. 888,634.     Specification of Letters Patent.     Patented May 26, 1908.

Application filed May 11, 1907. Serial No. 373,186.

*To all whom it may concern:*

Be it known that I, THOMAS W. MORGAN, a citizen of the United States of America, and a resident of Waterloo, Blackhawk county, Iowa, have invented certain new and useful Improvements in Driving Mechanism for Centrifugal Cream-Separators, of which the following is a specification.

My invention relates to improvements in driving mechanism for centrifugal cream separators, and the object of my improvements is to furnish a simple combination of coacting spiral- and spur-gearing, having an intermediate ratchet connection or toothed device for disconnecting the interacting gearing when desired. This object I have accomplished by the means which are hereinafter described and claimed, and which are illustrated in the accompanying drawings, in which—

Figure 1 is a view in perspective of my improved driving-mechanism in operative connection with the bowl of a centrifugal cream separator; Fig. 2 is an end elevation of said mechanism; Fig. 3 is a central vertical axial section of the toothed disconnecting device, and Fig. 4 is an under plan view of the toothed face of said device.

Similar numbers refer to similar parts throughout the several views.

I have shown in Fig. 1 the bowl 1 of a centrifugal cream separator having a spindle provided with a spiral thread at its lower end. The lower extremity of said spindle is diminished in diameter and seated in a bearing 4 in the base-plate 5.

6 is a spur-gear-wheel adapted to have its teeth intermesh with the spiral threads on the spindle 2, by being inclined to a proper degree, as shown in Fig. 2, to the axis of said spindle. In this position, such teeth engage such spiral threads at the proper angle to cause them to make the most effective contact therewith, the result being that more than one of these spiral threads engage a similar number of spur-teeth at the same time, thus distributing frictional contact over a larger surface than would be the case were a spur-pinion and gear-wheel to be intermeshing. The spur-gear-wheel 6 with its downwardly extending hub 15 is rotatable on the rotatable shaft 10 set in the upper seat and lower seat 11 and 16. A spiral pinion 9 is fixedly mounted on said shaft 10 just above the spur-gear-wheel 6, and intermeshes with the teeth of the spur-gear-wheel 12, said spiral-pinion 9 being set at the same angle with the axis of the spur-gear-wheel 12, as its own axis is inclined to the axis of the spindle 2. The intermeshing contact between the teeth of the spur-gear-wheel 12 and the spiral-gear 9 is thus the same as the contact between the spiral-threads 3 and the spur-gear-wheel teeth 6. The spur-gear-wheel 12 is fixedly mounted on a vertical shaft 13, whose lower end is stepped in a seat 14, rotatably. As shown in Fig. 2, the upper end of the shaft 13 has a bevel-pinion 19 secured thereto, whose teeth intermesh with the teeth of a bevel-gear-wheel 20 affixed to a horizontal shaft 21. A crank 22, provided with a handle 23, is secured to said shaft 21, for driving purposes. In order to provide means whereby said crank 22 may be stopped in mid-course of rotation, I have provided a device for disconnecting the gearing above described. The spiral-gear-wheel 9 has at its lower end a hub or enlargement 8, whose lower surface is so hollowed out as to provide the teeth 24 and 25. But two such teeth are shown, although it is obvious that a greater number might be used if desired. The toothed surface of the hub 8 rests directly upon the upper surface of the spur-gear-wheel 6.

18 is a hole drilled within the wheel 6 from above as shown in Fig. 3, and is used as a seat for the slidable pin 7 which fits perfectly within it. A spiral spring 17 is placed within the hole 18, the pin 7 resting upon the spring, the resilient action of the latter tending to always elevate one end of the pin above the upper surface of the wheel 6 so as to engage with one of the teeth on the lower surface of the hub 8. When the crank 22, gearing 19—20, shaft 13, gear-wheel 12 and spiral pinion 9 are rotated in one direction, the nearest tooth on said hub 8 engages the upper end of the pin 7 and carries it around, thus imparting rotation to the balance of the train of gearing, 6 and 3. When the crank 22 is held so as to stop the motion of the gear-wheels 12 and 9, the balance of the train with the bowl 1 continues in uninterrupted rotation, the pin 7 merely being pushed down into the hole 18 when it moves past one of the teeth, either 24 or 25, on the lower surface of the hub 8, until such rotation naturally ceases.

In the place of the slidable pin shown, if desired, a stud of the same shape may be fixed to the upper surface of the gear-wheel 6, and the shaft 10 allowed such an amount of axial lift as will permit the enlargement 8 to be elevated when the fixed stud aforesaid passes under it when the spiral-pinion's motion is arrested. The effect upon the action of the mechanism is identical in either case.

Having described my invention, what I claim as new, and desire to secure by Letters Patent, is—

1. In combination, a driven shaft, a spur-gear-wheel secured thereon, a rotatable and slidable shaft, a spiral pinion secured thereon and intermeshing with the said spur-gear-wheel, said spiral pinion having a lower portion of greater diameter with a ratcheted under surface, a spur-gear-wheel rotatably mounted on said rotatable shaft below said spiral pinion and having a projecting pin adapted to engage the teeth on said spiral pinion's ratcheted lower surface, and a spiral pinion in mesh with the latter spur-gear-wheel.

2. In combination, a rotatable shaft, a bevel-gear-wheel secured thereon, a rotatable shaft, a bevel pinion secured thereto adapted to intermesh with said bevel-gear-wheel, a spur-gear-wheel secured to the latter shaft, a rotatable shaft set at an inclination to said latter shaft, a spiral-pinion integrally connected to the last-mentioned shaft, a spur-gear-wheel rotatably mounted on said last mentioned shaft, a clutch-coupling connected between said spiral-pinion and the last mentioned spur-gear-wheel, and a spiral pinion in mesh with said last mentioned spur-gear-wheel.

3. In combination, a driven shaft, a spur-gear-wheel secured thereon, a rotatable shaft, a spiral-pinion fixedly secured thereto and in mesh with said spur-gear-wheel, said spiral-pinion having an enlarged base with radial teeth on its under surface, a spur-gear-wheel rotatably mounted below said spiral-pinion on said rotatable shaft, and having a bearing-hole in its upper surface, a compression-spring in said bearing hole, a slidable pin in said bearing-hole over said spring, the outer end of said pin normally projected beyond the outer surface of the spur-gear-wheel by the action of said spring and adapted to engage a tooth on the base of the spiral-pinion when the latter is rotated in one direction but be driven by such teeth into said bearing-hole when the rotation of such spiral-pinion is arrested, and a spiral pinion in mesh with the last mentioned spur-gear-wheel.

4. In combination, a spur-gear-wheel, a spiral-pinion in mesh therewith mounted on a rotatable shaft, a spur-gear-wheel rotatably mounted on the same shaft with the spiral-pinion, and a spiral-pinion in mesh with the last-mentioned spur-gear-wheel, and a ratchet-coupling interposed at a desired place in said train of gearing adapted to be disconnected when the rotation of the said first-mentioned spur-gear-wheel is arrested.

Signed at Waterloo, Iowa, this 23d day of April 1907.

THOMAS W. MORGAN.

Witnesses:
O. D. YOUNG,
G. C. KENNEDY.